(12) United States Patent
Fan et al.

(10) Patent No.: US 10,738,818 B2
(45) Date of Patent: Aug. 11, 2020

(54) ELASTIC WASHER STRUCTURE AND FASTENER

(71) Applicant: HUAWEI TECHNOLOGIES CO., LTD., Shenzhen (CN)

(72) Inventors: Guohua Fan, Shenzhen (CN); Xiong Hu, Shenzhen (CN); Dingnan Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 16/015,211

(22) Filed: Jun. 22, 2018

(65) Prior Publication Data

US 2018/0298935 A1    Oct. 18, 2018

Related U.S. Application Data

(63) Continuation of application No. PCT/CN2016/111330, filed on Dec. 21, 2016.

(30) Foreign Application Priority Data

Dec. 22, 2015  (CN) .......................... 2015 1 0973583

(51) Int. Cl.
*F16B 31/02* (2006.01)
*F16B 39/24* (2006.01)
*F16B 43/00* (2006.01)

(52) U.S. Cl.
CPC ............ *F16B 31/028* (2013.01); *F16B 39/24* (2013.01); *F16B 43/00* (2013.01)

(58) Field of Classification Search
CPC ............................. F16B 31/028; F16B 35/048
USPC ................... 411/10, 11, 13, 14, 401
See application file for complete search history.

(56) References Cited

U.S. PATENT DOCUMENTS

| | | | | |
|---|---|---|---|---|
| 2,781,687 A | * | 2/1957 | Knocke | F16B 39/24 411/11 |
| 3,169,440 A | * | 2/1965 | Taylor | E21D 21/02 411/11 |
| 3,992,974 A | * | 11/1976 | Miki | F16B 31/028 411/544 |
| 4,123,132 A | | 10/1978 | Hardy et al. | |

(Continued)

FOREIGN PATENT DOCUMENTS

| | | |
|---|---|---|
| CN | 101839277 A | 9/2010 |
| CN | 103398073 A | 11/2013 |

(Continued)

*Primary Examiner* — Flemming Saether
(74) *Attorney, Agent, or Firm* — Kilpatrick Townsend & Stockton LLP

(57) ABSTRACT

The present invention provides an elastic washer structure and a fastener, including: an elastic washer (1) and one or more tongues (2), where the elastic washer (1) is a sheet object with an inner hole (3), one surface of the elastic washer (1) is a convex surface, the other surface is a concave surface, a tongue (2) is disposed towards a side of the convex surface on an outer edge of the elastic washer, an angle between the tongue (2) and a surface (5) on which the outer edge of the elastic washer is located is a first angle (6), and when the convex surface of the elastic washer bears pressure, there is a negative correlation between the first angle (6) and the pressure borne by the elastic washer.

8 Claims, 3 Drawing Sheets

(56) References Cited

U.S. PATENT DOCUMENTS

| | | | | |
|---|---|---|---|---|
| 4,149,446 | A | * | 4/1979 | Spengler ............... F16B 31/028 |
| | | | | 411/11 |
| 4,159,483 | A | * | 6/1979 | Bettin .................. F16B 31/028 |
| | | | | 257/722 |
| 4,293,257 | A | * | 10/1981 | Peterson ................ G01L 5/243 |
| | | | | 411/11 |
| 4,572,717 | A | | 2/1986 | Swick et al. |
| 9,689,417 | B2 | * | 6/2017 | Stewart ................ F16B 31/028 |
| 2010/0236023 | A1 | | 9/2010 | Wang et al. |
| 2014/0017027 | A1 | | 1/2014 | Benzing |

FOREIGN PATENT DOCUMENTS

| | | |
|---|---|---|
| CN | 103547819 A | 1/2014 |
| CN | 203412906 U | 1/2014 |
| CN | 104895901 A | 9/2015 |
| CN | 105370702 A | 3/2016 |
| EP | 0384923 A1 | 9/1990 |
| FR | 2325918 A1 | 4/1977 |
| JP | H0814244 A | 1/1996 |
| JP | 2012072885 A | 4/2012 |

* cited by examiner

ELASTIC WASHER STRUCTURE AND FASTENER

CROSS-REFERENCE TO RELATED APPLICATIONS

This application is a continuation of International Application No. PCT/CN2016/111330, filed on Dec. 21, 2016, which claims priority to Chinese Patent Application No. 201510973583.0, filed on Dec. 22, 2015. The disclosures of the aforementioned applications are hereby incorporated by reference in their entireties.

TECHNICAL FIELD

The present invention relates to the mechanical field, and in particular, to an elastic washer structure and a fastener.

BACKGROUND

A fastener is a type of mechanical accessory used for fastening and connection and is widely applied. Various fasteners are used in machineries, devices, vehicles, ships, railways, bridges, buildings, structures, tools, instruments, meters, articles for use, and the like. A type of fastener with a national standard is referred to as a standard fastener, or referred to as a standard part for short. The fastener is the most widely used basic mechanical accessory.

The fastener generally includes the following 13 types of accessories: a bolt, a stud, a screw, a nut, a self-tapping screw, a wood screw, a washer, a ring, a pin, a rivet, an assembly and a bolt, a welded screw, and a wire thread insert. The washer is a fastener shaped like an oblate ring, and is placed between a supporting plane of a bolt, a screw, or a nut and a surface of a connection accessory, so as to enlarge a contact surface area of a connected accessory, reduce unit area pressure, and protect a surface of the connected accessory from being damaged. Another elastic washer is further capable of preventing the nut from loosening.

During fastening, the fastener needs to be fastened according to a specified or required torque. An improper tightening torque loosens and invalidates the screw, causing a relatively high security risk and a relatively severe potential quality threat. Currently, a common method on the market is to use an additional professional torque tool such as a torque batch, a torque wrench, or a torque socket for fastening, so as to ensure a tightening torque.

At present, the torque tool is much more expensive than a common tool, and some Japanese products with a higher requirement are more expensive, increasing production investment. In addition, for fastening by using a tool, a professional person needs to adjust torques specific to different screw models, and a common operator is prone to an incorrect operation, causing a quality threat.

SUMMARY

According to an elastic washer structure and a fastener provided in embodiments of the present invention, a tongue is disposed towards a side of the convex surface of an elastic washer on an outer edge of the elastic washer, and an angle between the tongue and a convex surface of the elastic washer is a first angle, so that when the convex surface of the elastic washer bears pressure, the first angle changes along with a change of the pressure borne by the elastic washer. This resolves a technical problem that a relatively high security risk and a relatively severe potential quality threat are caused because an improper tightening torque loosens and invalidates a screw, and achieves a technical effect that a fastening status of the fastener is intuitively displayed with low costs and high efficiency.

A first aspect provides an elastic washer structure and a fastener, including an elastic washer (1) and one or more tongues (2), where the elastic washer (1) is a sheet object with an inner hole (3), one surface of the elastic washer (1) is a convex surface, the other surface is a concave surface, a tongue (2) is disposed towards a side of the convex surface on an outer edge (4) of the elastic washer, an angle between the tongue (2) and a plane (5) on which the outer edge (4) of the elastic washer (1) is located is a first angle (6), when the convex surface of the elastic washer bears pressure, there is a negative correlation between the first angle (6) and the pressure borne by the elastic washer (1), and the first angle (6) is an obtuse angle.

In a first possible implementation of the first aspect, that there is a negative correlation between the first angle (6) and the pressure borne by the elastic washer (1) specifically includes:

when the pressure borne by the elastic washer (1) is less than preset maximum bearing pressure of the elastic washer (1), larger pressure borne by the elastic washer (1) indicates a smaller value of the first angle (6);

or when the pressure borne by the elastic washer (1) is greater than or equal to preset maximum bearing pressure of the elastic washer (1), both the convex surface and the concave surface of the elastic washer (1) are turned into planes, the first angle (6) is a right angle, and the maximum bearing pressure is minimum pressure required for pressing the elastic washer (1) to be flat by the fastening bolt (7); or when the pressure borne by the elastic washer (1) is greater than or equal to preset maximum bearing pressure of the elastic washer (1), both the convex surface (111) and the concave surface (112) of the elastic washer (1) are turned into planes, and the first angle (6) is any angle that falls within a range from 80 degrees to 100 degrees (including 80 degrees and 100 degrees).

With reference to the first aspect or the first possible implementation of the first aspect, in a second possible implementation, there is a positive correlation between a concave-convex degree of the convex surface and the concave surface of the elastic washer (1) and the preset maximum bearing pressure.

With reference to the second possible implementation of the first aspect, in a third possible implementation, when the preset maximum bearing pressure of the elastic washer (1) is less than pressure that needs to be borne, the elastic washer structure and one or more elastic washers (1) are superposed into one group, so as to increase the maximum bearing pressure of the elastic washer structure.

With reference to the third possible implementation of the first aspect, in a fourth possible implementation, an opening groove is disposed on an edge of the inner hole (3) of the elastic washer (1), so as to increase an elasticity level of the elastic washer (1).

With reference to any one of the first aspect to the fourth possible implementation of the first aspect, in a fifth possible implementation, when the elastic washer structure loosens and springs back after being fastened, the first angle (6) increases, where there is a positive correlation between a degree of an increase of the first angle (6) and an amplitude of springing back by the elastic washer structure.

With reference to any one of the first aspect to the fifth possible implementation of the first aspect, in a sixth possible implementation, one or two surfaces of the tongue (2) have a color different from that of the elastic washer structure, so as to intuitively display the first angle.

A second aspect provides an elastic washer structure and a fastener, including a fastening bolt (7) and the elastic washer structure according to any one of the first aspect, or any one of the first to the sixth possible implementations of the first aspect.

In a first possible implementation of the second aspect, the fastening bolt (7) includes an upper edge (8), a step (9), and a stud (10), the stud (10) is configured to pass through the inner hole (3) of the elastic washer (1) to apply pressure to a convex surface of the elastic washer (1), so as to press the elastic washer (1) to form a plane.

With reference to the second aspect or the first possible implementation of the second aspect, in a second possible implementation, there is a positive correlation between the maximum bearing pressure of the elastic washer (1) and a standard tightening torque of the fastening bolt (7), and the maximum bearing pressure is minimum pressure required for pressing the elastic washer (1) to be flat by the fastening bolt (7).

With reference to any one of the second aspect to the second possible implementation of the second aspect, in a third possible implementation, a height of the step (9) is greater than a length of the tongue (2), so that there is no pressure between the tongue (2) and the upper edge (8) when the fastener is in a fastened state.

With reference to any one of the second aspect to the third possible implementation of the second aspect, in a fourth possible implementation, a diameter of a cross-section of the step (9) is less than or equal to a diameter of the elastic washer (1).

According to the present invention, a tongue is disposed towards a side of the convex surface of an elastic washer on an outer edge of the elastic washer, and an angle between the tongue and a convex surface of the elastic washer is a first angle, so that when the convex surface of the elastic washer bears pressure, the first angle changes along with a change of the pressure borne by the elastic washer. This resolves a technical problem that a relatively high security risk and a relatively severe potential quality threat are caused because an improper tightening torque loosens and invalidates a screw, and achieves a technical effect that a fastening status of a fastener is intuitively displayed with low costs and high efficiency.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
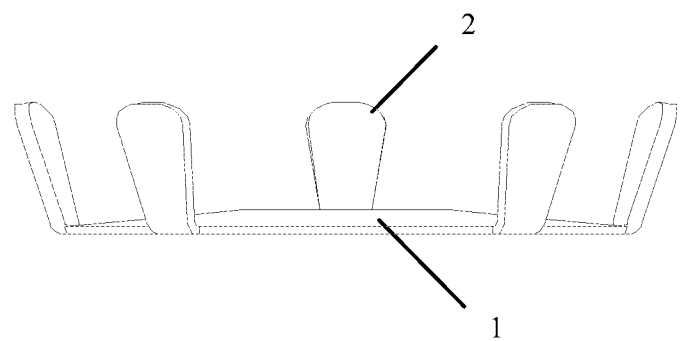
FIG. 1 is a side view of an elastic washer structure according to an embodiment of the present invention.

As shown in FIG. 1, FIG. 1 shows an elastic washer structure according to an embodiment of the present invention, including an elastic washer (1), where one surface of the elastic washer (1) is a convex surface, the other surface is a concave surface, and a tongue (2) is disposed towards a side of the convex surface on an outer edge (4) of the elastic washer.

Figure 2:
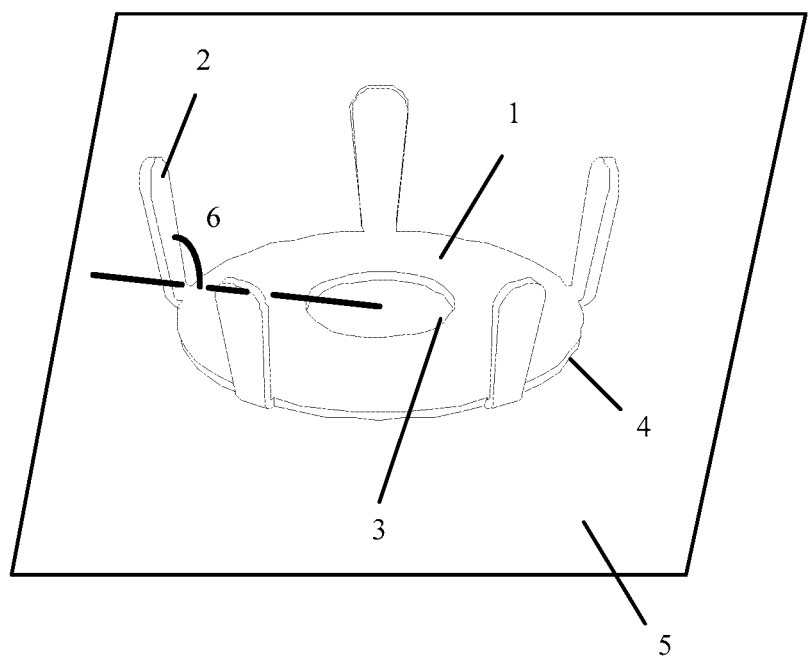
FIG. 2 is another structural diagram of an elastic washer structure according to an embodiment of the present invention.

As shown in FIG. 2, FIG. 2 shows an elastic washer structure according to an embodiment of the present invention, including an elastic washer (1) and one or more tongues (2), where the elastic washer (1) is a sheet object with an inner hole (3), one surface of the elastic washer (1) is a convex surface, the other surface is a concave surface, a tongue (2) is disposed towards a side of the convex surface on an outer edge (4) of the elastic washer, an angle between the tongue (2) and a plane (5) on which the outer edge (4) of the elastic washer (1) is located is a first angle (6), when the convex surface of the elastic washer bears pressure, there is a negative correlation between the first angle (6) and the pressure borne by the elastic washer (1), and the first angle (6) is an obtuse angle.

Figure 3:
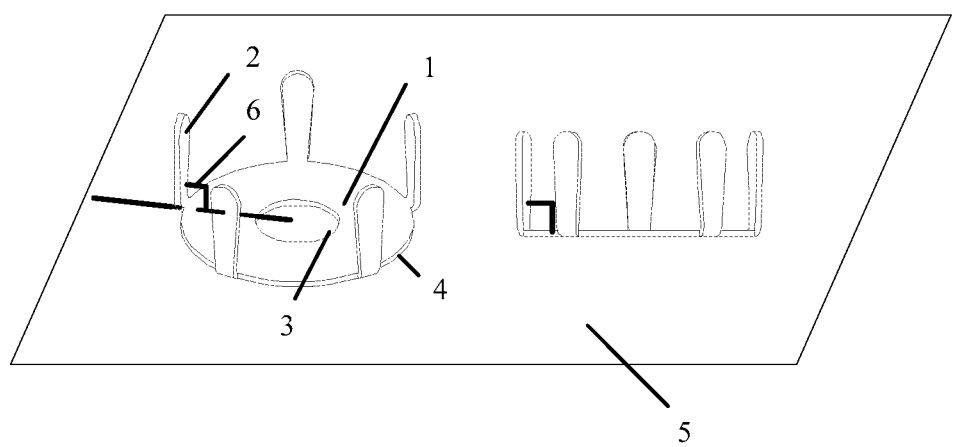
FIG. 3 is still another structural diagram of an elastic washer structure according to an embodiment of the present invention.

Further, as shown in FIG. 3, that there is a negative correlation between the first angle (6) and the pressure borne by the elastic washer (1) specifically includes:

when the pressure borne by the elastic washer (1) is less than preset maximum bearing pressure of the elastic washer (1), larger pressure borne by the elastic washer (1) indicates a smaller value of the first angle (6); or when the pressure borne by the elastic washer (1) is greater than or equal to preset maximum bearing pressure of the elastic washer (1), both the convex surface (111) and the concave surface (112) of the elastic washer (1) are turned into planes, the first angle (6) is a right angle, and the maximum bearing pressure is minimum pressure required for pressing the elastic washer (1) to be flat by the fastening bolt (7); or when the pressure borne by the elastic washer (1) is greater than or equal to preset maximum bearing pressure of the elastic washer (1), both the convex surface (111) and the concave surface (112) of the elastic washer (1) are turned into planes, and the first angle (6) is any angle that falls within a range from 80 degrees to 100 degrees.

Further, there is a positive correlation between a concave-convex degree of the convex surface and the concave surface of the elastic washer (1) and the preset maximum bearing pressure.

Figure 4:
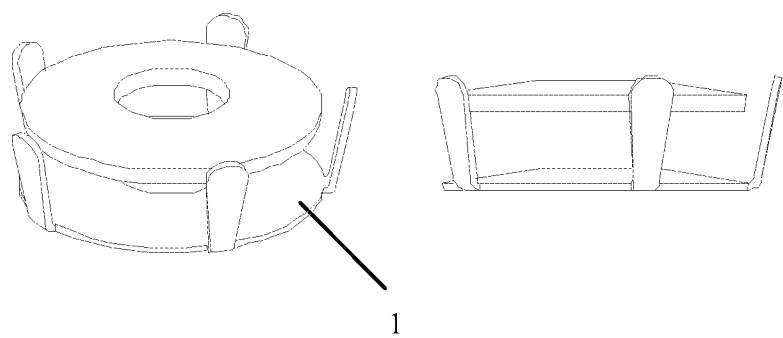
FIG. 4 is a structural diagram of an elastic washer structure assembly according to an embodiment of the present invention.

Further, as shown in FIG. 4, when the preset maximum bearing pressure of the elastic washer (1) is less than pressure that needs to be borne, the elastic washer structure and one or more elastic washers (1) are superposed into one group, so as to increase the maximum bearing pressure of the elastic washer structure.

Further, an opening groove is disposed on an edge of the inner hole (3) of the elastic washer (1), so as to increase an elasticity level of the elastic washer (1).

Further, when the elastic washer structure loosens and springs back after being fastened, the first angle (6) increases, where there is a positive correlation between a degree of an increase of the first angle (6) and an amplitude of springing back by the elastic washer structure.

Further, one or two surfaces of the tongue (2) have a color different from that of the elastic washer structure, so as to intuitively display the first angle.

Further, one or more tongues (2) of the elastic washer structure have a color different from that of the elastic washer (1).

Further, the elastic washer (1) is ring-shaped, square, hexagonal, polygonal.

Figure 5:
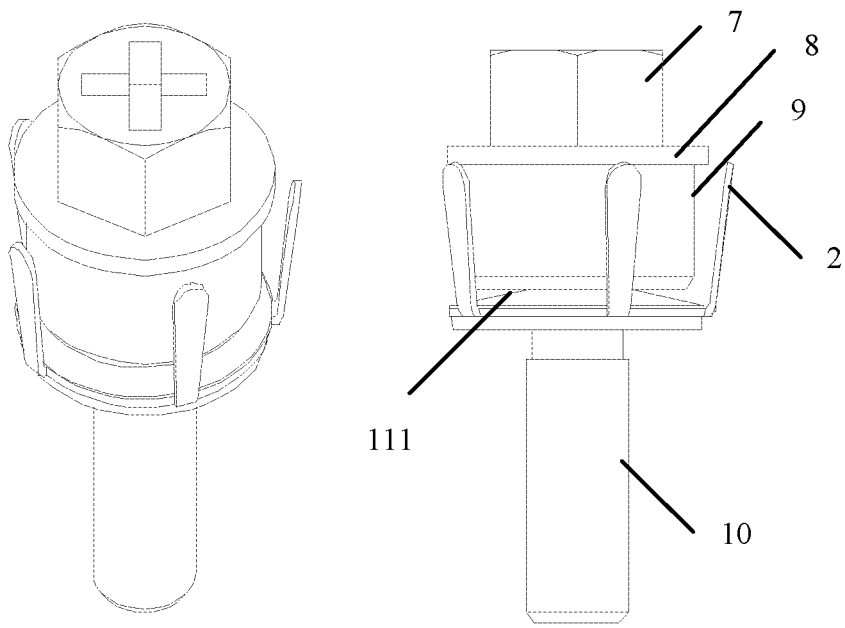
FIG. 5 is a structural diagram of a fastener according to an embodiment of the present invention.

As shown in FIG. 5, a fastener according to an embodiment of the present invention includes a fastening bolt (7) and the elastic washer structure according to any one of the first aspect, or any one of the first to the sixth possible implementations of the first aspect.

Further, the fastening bolt (7) includes an upper edge (8), a step (9), and a stud (10), and the stud (10) is configured to pass through the inner hole (3) of the elastic washer (1) to apply pressure to the convex surface of the elastic washer (1), so as to press the elastic washer (1) to form a plane.

Further, there is a positive correlation between the maximum bearing pressure of the elastic washer (1) and a standard tightening torque of the fastening bolt (7), and the maximum bearing pressure is minimum pressure required for pressing the elastic washer (1) to be flat by the fastening bolt (7).

Figure 6:
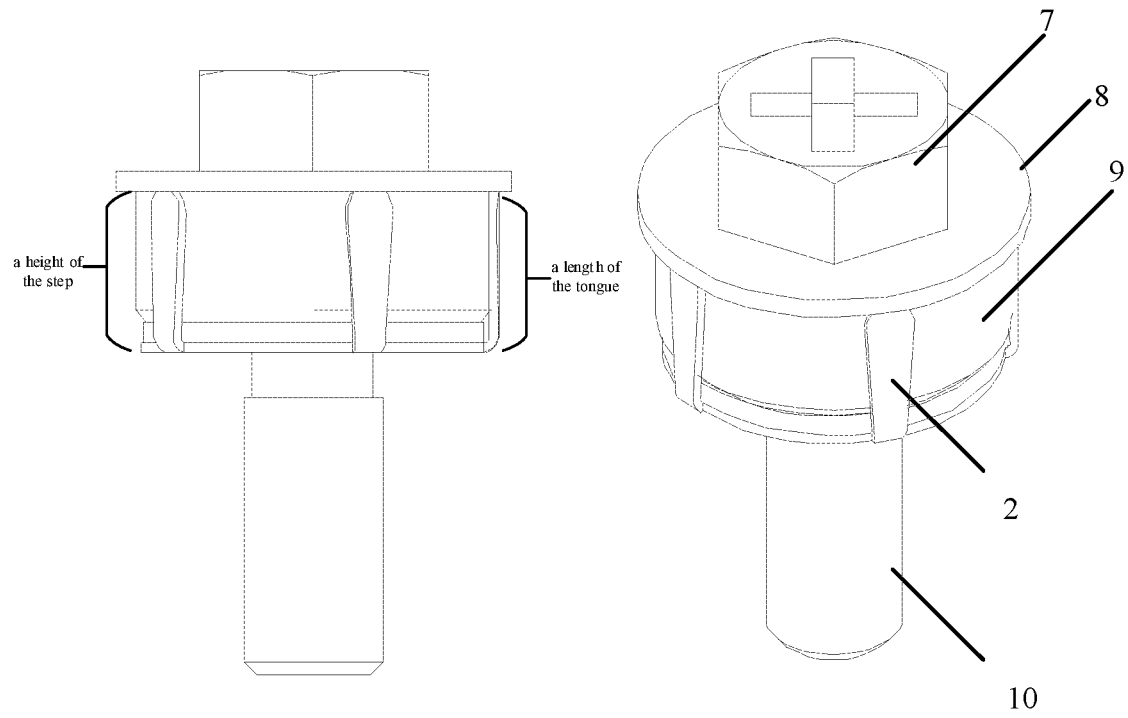
FIG. 6 is another structural diagram of a fastener according to an embodiment of the present invention.

Further, as shown in FIG. 6, a height of the step (9) is greater than a length of the tongue (2), so that there is no pressure between the tongue (2) and the upper edge (8) when the fastener is in a fastened state.

Further, a diameter of a cross-section of the step (9) is less than or equal to a diameter of the elastic washer (1). Specifically, the cross-section of the step is circular, square, or polygonal. A diameter of a circumcircle of the cross-section of the step is less than or equal to the diameter of the elastic washer (1).

Further, the fastener further includes a nut.

Beneficial effects: A tongue is disposed towards a side of the convex surface of an elastic washer on an outer edge of the elastic washer, and an angle between the tongue and a convex surface of the elastic washer is a first angle, so that when the convex surface of the elastic washer bears pressure, the first angle changes along with a change of the pressure borne by the elastic washer. This resolves a technical problem that a relatively high security risk and a relatively severe potential quality threat are caused because an improper tightening torque loosens and invalidates a screw, and achieves a technical effect that a fastening status of a fastener is intuitively displayed with low costs and high efficiency.

The present invention may be implemented in a plurality of implementations. The embodiments of the present invention may be executed by a specific software or hardware component. Persons skilled in the art consider that different software or hardware combinations may also be applied to execute the embodiments of the present invention, and that the specific operations executed by hardware may also be implemented by software.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A fastener, comprising a fastening bolt and an elastic washer structure, wherein
   the elastic washer structure, comprising an elastic washer and one or more tongues, wherein
      the elastic washer is a sheet object with an inner hole, one surface of the elastic washer being a convex surface, another surface of the elastic washer being a concave surface, and
      a tongue of the one or more tongues is disposed towards a side of the convex surface of the elastic washer on an outer edge of the elastic washer, an angle between the tongue and a plane on which the outer edge of the elastic washer is located being a first angle, the first angle being an obtuse angle; and
   the fastening bolt comprises an upper edge and a step, wherein the step is configured to apply pressure to the convex surface of the elastic washer, so as to press the elastic washer to form a plane, a height of the step being greater than a length of the tongue, so that there is no pressure between the tongue and the upper edge when the fastener is in a fastened state.

2. The fastener elastic washer structure according to claim 1, wherein that there is a negative correlation between the first angle and the pressure borne by the elastic washer comprises the elastic washer is configured that:
   when the pressure borne by the elastic washer is less than preset maximum bearing pressure of the elastic washer, larger pressure borne by the elastic washer indicates a smaller value of the first angle; or
   when the pressure borne by the elastic washer is greater than or equal to preset maximum bearing pressure of the elastic washer, both the convex surface and the concave surface of the elastic washer are turned into planes, the first angle is a right angle, and the maximum bearing pressure is minimum pressure required for pressing the elastic washer to be flat by a fastening bolt.

3. The fastener according to claim 1, wherein the elastic washer is configured that: when preset maximum bearing pressure of the elastic washer is less than pressure to be borne, the elastic washer structure and one or more elastic washers are superposed into one group, so as to increase the maximum bearing pressure of the elastic washer structure.

4. The fastener according to claim 1, wherein the elastic washer is configured that: when the elastic washer structure loosens and springs back after being fastened, the first angle increases, wherein there is a positive correlation between a degree of an increase of the first angle and an amplitude of springing back by the elastic washer structure.

5. The fastener according to claim 1, wherein one or two surfaces of the tongue have a color different from that of the elastic washer, so as to intuitively display the first angle.

6. The fastener according to claim 1, wherein there is a positive correlation between maximum bearing pressure of the elastic washer and a standard tightening torque of the fastening bolt, and the maximum bearing pressure is minimum pressure required for pressing the elastic washer to be flat by the fastening bolt.

7. The fastener according to claim 1, wherein a diameter of a cross-section of the step is less than or equal to a diameter of the elastic washer.

8. The fastener according to claim 1, wherein the elastic washer is configured that, when the convex surface of the elastic washer bears pressure, there is a negative correlation between the first angle and the pressure borne by the elastic washer.

* * * * *